US012621296B2

(12) United States Patent
Tanaka

(10) Patent No.: US 12,621,296 B2
(45) Date of Patent: May 5, 2026

(54) CORRELATIONS BETWEEN PRIVATE NETWORK ADDRESSES AND ASSIGNED NETWORK ADDRESSES

(71) Applicant: HEWLETT PACKARD ENTERPRISE DEVELOPMENT LP, Spring, TX (US)

(72) Inventor: Takaharu Tanaka, Tokyo (JP)

(73) Assignee: Hewlett Packard Enterprise Development LP, Spring, TX (US)

( * ) Notice: Subject to any disclaimer, the term of this patent is extended or adjusted under 35 U.S.C. 154(b) by 648 days.

(21) Appl. No.: 18/152,804

(22) Filed: Jan. 11, 2023

(65) Prior Publication Data

US 2024/0236092 A1     Jul. 11, 2024

(51) Int. Cl.
*H04L 9/40*          (2022.01)
*H04L 61/5014*       (2022.01)

(52) U.S. Cl.
CPC ...... *H04L 63/0876* (2013.01); *H04L 61/5014* (2022.05); *H04L 63/0435* (2013.01)

(58) Field of Classification Search
CPC ............. H04L 63/0876; H04L 61/5014; H04L 63/0435
See application file for complete search history.

(56) References Cited

U.S. PATENT DOCUMENTS 11,483,283  B1 *  10/2022  Choukir ................ H04L 61/251
2015/0281947  A1   10/2015  Patil et al.

2015/0365281  A1   12/2015  Marino et al.
2016/0269359  A1    9/2016  Adrangi et al.
2023/0179567  A1 *   6/2023  Devaraj .............. H04L 61/5053
                                                      709/245

FOREIGN PATENT DOCUMENTS

WO        2017/026930 A1      2/2017

OTHER PUBLICATIONS

"Implementing MAC Randomization", Retrieved from: https://source.android.google.cn/docs/core/connect/wifi-mac-randomization, retrieved on : Jan. 19, 2023, pp. 4.

(Continued)

*Primary Examiner* — Paul E Callahan
(74) *Attorney, Agent, or Firm* — Trop, Pruner & Hu, P.C.

(57)                ABSTRACT

In some examples, a management system receives, from an electronic device, a message containing a first information element that includes a first address of the electronic device, and a second information element that includes a device identifier of the electronic device, where the first address differs from an assigned network address assigned to the electronic device. In response to the first address extracted from the first information element and the device identifier extracted from the second information element of the message, the management system generates correlation information that associates a private network address of the electronic device with a value that represents the assigned network address. The management system applies a management action for the electronic device based on the correlation information.

18 Claims, 6 Drawing Sheets

(56)	References Cited

OTHER PUBLICATIONS

Apple Platform Security, MAC address randomisation, retrieved from: https://support.apple.com/en-in/guide/security/secb9cb3140c/web, retrieved on: Jan. 9, 2023, pp. 3.
HPE, "Client Quarantine and Authentication Solution HPE Quarantine System", available online at <https://www-hpe-com.translate.goog/jp/ja/software/quarantine.html?_x_tr_sl=ja&_x_tr_tl=en&_x_tr_hl=ja&_x_tr_pto=nui>, 2023, 1 page.
Microsoft, "How to use random hardware addresses in Windows", Retrieved from: https://support.microsoft.com/en-us/windows/how-to-use-random-hardware-addresses-in-windows-ac58de34-35fc-31ff-c650-823fc48eb1bc, retrieved on : Jan. 19, 2023, pp. 3.
Wikipedia, "Dynamic Host Configuration Protocol" last edited Nov. 21, 2022, pp. 25.

* cited by examiner

Process
600

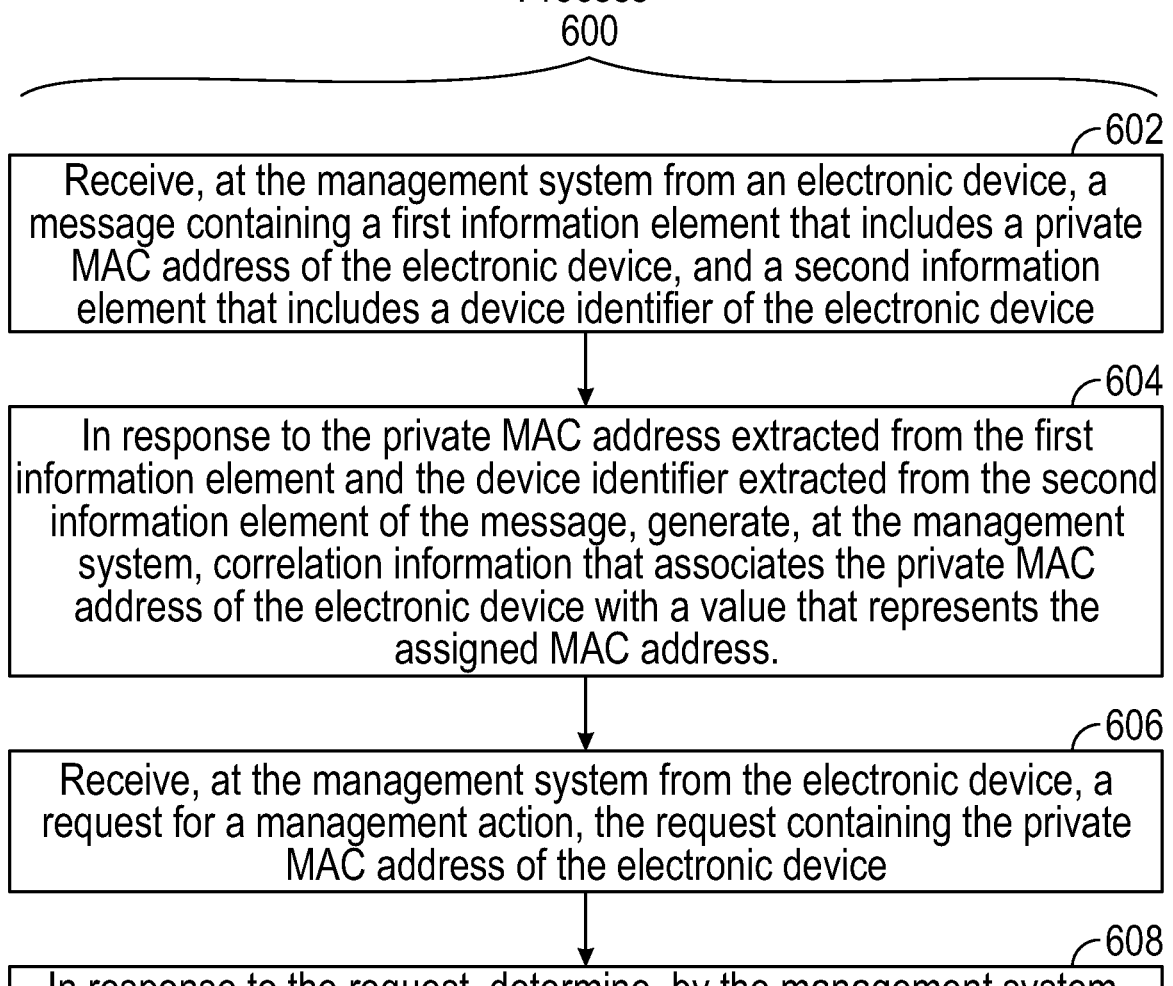

602

Receive, at the management system from an electronic device, a message containing a first information element that includes a private MAC address of the electronic device, and a second information element that includes a device identifier of the electronic device

604

In response to the private MAC address extracted from the first information element and the device identifier extracted from the second information element of the message, generate, at the management system, correlation information that associates the private MAC address of the electronic device with a value that represents the assigned MAC address.

606

Receive, at the management system from the electronic device, a request for a management action, the request containing the private MAC address of the electronic device

608

In response to the request, determine, by the management system, whether the private MAC address is in the correlation information

610

In response to the private MAC address being in the correlation information, apply, by the management system, the management action for the electronic device

FIG. 6

CORRELATIONS BETWEEN PRIVATE NETWORK ADDRESSES AND ASSIGNED NETWORK ADDRESSES

BACKGROUND

Electronic devices are able to connect to networks to communicate with other devices. An electronic device is assigned a network address that is used in communications of the electronic device over a network. The network address can include a Media Access Control (MAC) address.

BRIEF DESCRIPTION OF THE DRAWINGS

Some implementations of the present disclosure are described with respect to the following figures.

FIG. 6 is a flow diagram of a process according to some examples.

Figure 1:
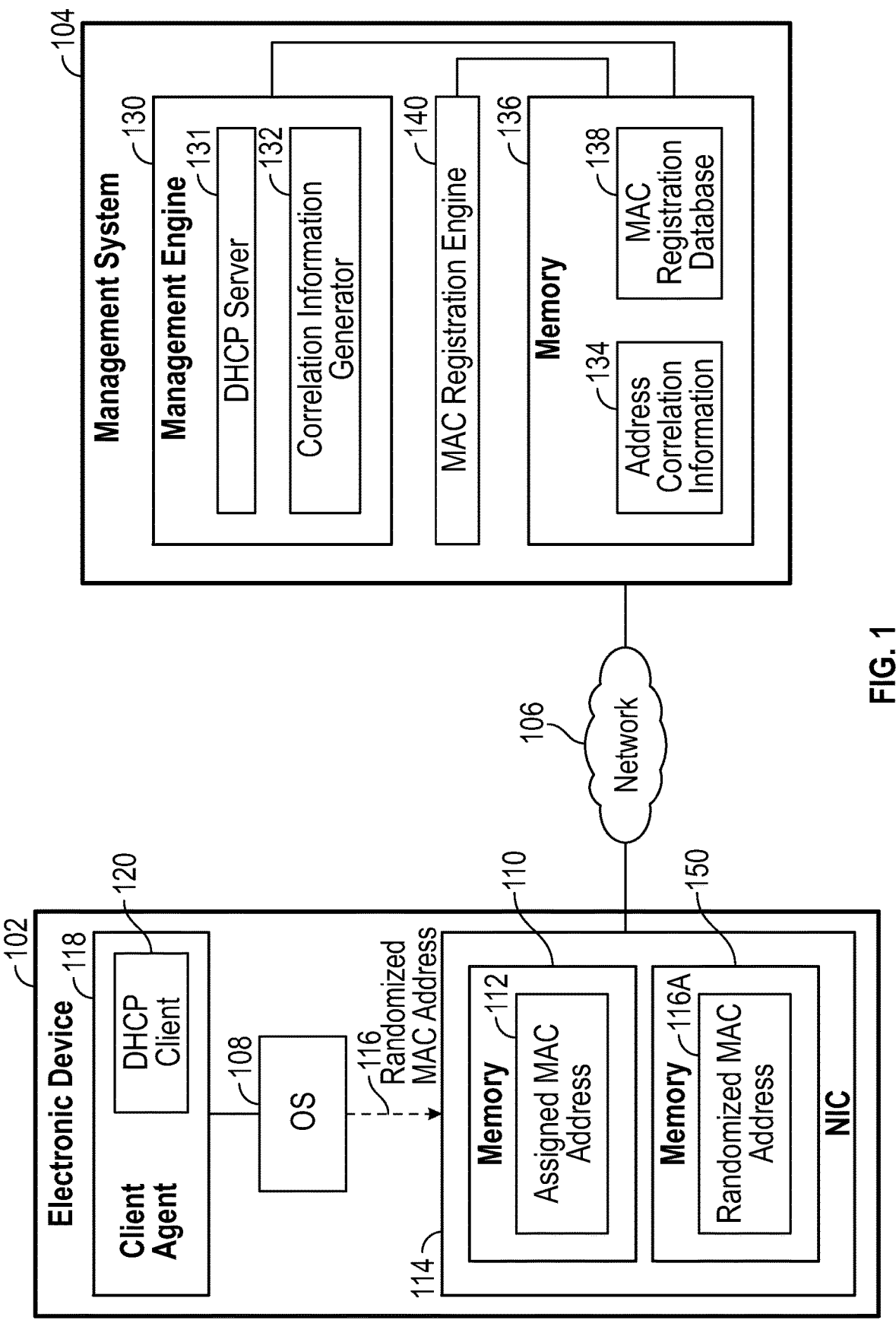
FIG. 1 is a block diagram of an arrangement that includes a client device and a management system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

For privacy, network addresses such as Media Access Control (MAC) addresses used by electronic devices can be randomized. Network address randomization produces randomized network addresses (also referred to as "private network addresses") that differ from the "real" MAC address of electronic devices.

A randomized network address can be used to protect the privacy of an electronic device, such as to prevent tracking of the location and/or network usage of the electronic device within a network. Protecting the privacy of an electronic device may be useful when the electronic device connects to a public network, such as a public wireless network (e.g., a public Wi-Fi network) or a public wired network.

However, the electronic device may also be used in a protected network, such as a network operated by an enterprise. An "enterprise" can refer to a business concern, a government agency, an educational organization, a non-profit organization, an individual, or any other type of entity. A "protected network" can refer to a network in which a security system ensures that electronic devices connecting to the network are in fact authorized to do so. The security system can perform any or some combination of the following security actions: device identification and authentication, authenticated assignment of an Internet Protocol (IP) address, network access control, network connection prevention, and so forth.

The security system relies on the "real" MAC address of an electronic device to perform its security actions. In other words, the "real" MAC address of the electronic device is the identity of the electronic device relied upon by the security system. If MAC address randomization is enabled in the electronic device such that the security system receives a randomized MAC address (private MAC address), then the security system may not be able to perform its security actions since the security system would not be able to successfully identify the electronic device. Although MAC address randomization can be turned off in electronic devices, turning off MAC address randomization can involve extra work for a user or an information technology (IT) administrator that is responsible for configuring devices for a network.

A management system (e.g., a security system or another type of management system) that relies on a real MAC address (also referred to as an "assigned MAC address") in performing management operations is referred to as an "assigned MAC address-based management system. In accordance with some implementations of the present disclosure, an assigned MAC address-based management system can perform a management action for an electronic device that communicates with a private network address based on generating, by the assigned MAC address-based management system, a correlation between the private network address and a value representing an assigned network address of the electronic device. In some examples, the electronic device sends, to the management system, a message containing a first information element that includes the private network address (e.g., a randomized MAC address) of the electronic device, and a second information element that includes a device identifier (e.g., the assigned MAC address or a program-generated identity) of the electronic device. The private network address differs from the assigned network address of the electronic device. In response to the private network address extracted from the first information element and the device identifier extracted from the second information element of the message, the management system generates correlation information that associates the private network address with a value (e.g., the assigned MAC address or a pseudo MAC address) that represents the assigned network address. The management system applies a management action for the electronic device based on the correlation information.

In some examples, the management system can be a security system, and the management action includes a security action. Examples of security actions that can be performed with respect to an electronic device include any or some combination of the following: determining whether or not to allow the electronic device to connect to or use a network or another resource (e.g., a computing resource, a storage resource, a program resource, etc.), selecting, from among different types of networks, a network to which the electronic device is to connect, or other security actions. Examples of types of networks include an operational network in which electronic devices are able to communicate with one another or access resources during normal operations of the electronic devices, or a quarantine network with restricted access to prevent electronic devices with issues (e.g., electronic devices infected with malware, electronic devices in which certain programs are missing or in which the latest program patches have not been installed, etc.) from accessing resources over the network.

In other examples, a management system can be another type of management system that depends on an assigned network address of the electronic device in deciding actions to take. For example, the management system can assign an Internet Protocol (IP) address based on the assigned network address of the electronic device. An example of such a management system is a Dynamic Host Configuration Protocol (DHCP) server. In some examples, a DHCP server applies authenticated DHCP in which an IP address is assigned to an electronic device if the electronic device can be authenticated.

In further examples, a management system can include a mobile device management (MDM) system, which controls, secures, and enforces policies on electronic devices, such as by ensuring that certain programs are installed, enforcing security controls on the electronic devices, and so forth. An MDM system may also rely on assigned network addresses of electronic devices to perform its management actions.

By using techniques or mechanisms according to some implementations of the present disclosure, electronic devices can use private network addresses to protect the privacy of the electronic devices, while at the same time allowing management systems that rely on assigned network addresses of the electronic devices to perform management actions. The assigned network address of an electronic device can be kept hidden from other devices (peer devices, client devices, etc.) on a network while the management system can perform a management action with respect to the electronic device.

FIG. 1 is a block diagram of an example arrangement that includes an electronic device 102 and a management system 104. Although FIG. 1 shows just one electronic device, in other examples, there can be multiple electronic devices that are managed by the management system 104. Examples of electronic devices can include any or some combination of the following: computers (e.g., desktop computers, laptop computers, tablet computers, server computers, etc.), smartphones, game appliances, household appliances, vehicles (or controllers in vehicles), storage systems, communication nodes, and so forth.

The management system 104 can be implemented using a computer or multiple computers. Examples of the management system 104 can include any or some combination of the following: a security system, a DHCP server system (e.g., that performs authenticated DHCP processes), an MDM system, and so forth.

The electronic device 102 is connected to the management system 104 over a network 106. Examples of the network 106 can include any or some combination of the following: a local area network (LAN), a wide area network (WAN), a public network, and so forth. The network 106 can include a wireless network and/or a wired network.

The electronic device 102 includes an operating system (OS) 108. Examples of the OS 108 can include any or some combination of the following: a Linux OS, a Unix OS, a WINDOWS OS, an ANDROID OS, an iOS, and so forth.

The electronic device 102 includes a network interface controller (NIC) 114, which performs network communications over the network 106. The electronic device 102 is assigned a MAC address (referred to as an "assigned MAC address" 112), which can be stored in a memory 110 of the electronic device. In some examples, the assigned MAC address 112 can be assigned by the manufacturer of the NIC 114 or another entity.

In some examples, the memory 110 in which the assigned MAC address 112 is stored is a read-only memory (ROM). In other examples, other types of memory devices can be used to store the assigned MAC address 112, such as a dynamic random access memory (DRAM) device, a static random access memory (SRAM) device, a flash memory device, and so forth. By storing the assigned MAC address 112 in a ROM, the assigned MAC address 112 cannot be changed. In other examples, the assigned MAC address 112 can be changed. The NIC 114 can further include another memory 150. In an example, the memory 110 can be a ROM, while the memory 150 can be a DRAM or SRAM.

In other examples, instead of storing the assigned MAC address 112 in the memory 110 within the NIC 114, the assigned MAC address 112 can be stored in a different storage location of the electronic device 102, such as a storage location associated with firmware (e.g., Basic Input/Output System (BIOS) code) of the electronic device 102.

In some examples, assuming that MAC address randomization is not used, the assigned MAC address 112 can be used by the NIC 114, and more specifically, by a MAC layer of the NIC 114, to perform data link communications over the network 106, in which data frames are exchanged and routed through the network using source and destination MAC addresses in the data frames.

In further examples, the OS 108 can implement MAC address randomization, in which a randomized MAC address 116 is generated by the OS 108 for use by the NIC 114 in communications over the network 106, instead of the assigned MAC address 112. When MAC address randomization is employed by the OS 108, the OS 108 sends the randomized MAC address 116 to the NIC 114, which stores the randomized MAC address 116 as stored randomized MAC address 116A in the memory 150 (or alternatively, in the memory 110). In some examples, the randomized MAC address 116 can be generated based on a random number produced by a random number generator of the OS 108. In other examples, the randomized MAC address 116 can be generated using a different technique, such as by selecting different private MAC addresses from a pool of private MAC addresses. For each new connection established by the electronic device 102 over the network 106, a different randomized MAC address 116 can be produced by the OS 108 for use.

The management system 104 includes a management engine 130 that relies upon an assigned device identifier (e.g., the assigned MAC address 112) of the electronic device 102 to perform a management action with respect to the electronic device 102. Thus, if the electronic device 102 provides the randomized MAC address 116 (instead of the assigned MAC address 112) to the management system 104, then the management engine 130 would not be able to properly perform the management action.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

There are two different techniques that can be used by the management system 104 to derive an assigned device identifier for the electronic device 102 based on the randomized MAC address 116 received by the management system 104 from the electronic device 102. A first type of technique is referred to as a forward association technique, while a second type of technique is referred to as a post association technique.

In some examples, the electronic device 102 further includes a client agent 118 and a DHCP client 120. The DHCP client 120 can be part of the DHCP client 120 in some examples, and the DHCP client 120 can be separate from the client agent 118 in other examples.

The management system 104 further includes a memory 136 to store information. In addition, the management system 104 includes a DHCP server 131 and a correlation information generator 132, which can be part of the management engine 130 in some examples, or which can be separate from the management engine 130 in other examples. The management system 104 also includes a MAC registration engine 140, which can be separate from the management engine 130 in some examples, or which can be part of the management engine 130 in other examples.

In accordance with some implementations of the present disclosure, the DHCP client 120 and the DHCP server 131 of the electronic device 102 and the DHCP client 120 and the DHCP server 131 to support the use of private MAC addresses while still allowing the management system 104 that relies on assigned (real) MAC addresses to perform its management actions.

The functionalities of the foregoing components in the electronic device 102 and the management system 104 are discussed further in connection with FIG. 2 and FIGS. 3A-3B below, which depict examples of the forward association technique and the post association technique, respectively.

Forward Association Technique

Examples of the forward association technique are described in connection with FIGS. 1 and 2. Although FIG. 2 shows a specific order of tasks, it is noted that the order of tasks can be changed in other examples, some of the tasks may be omitted, or additional tasks may be added.

The OS 108 in the electronic device 102 generates (at 202) the randomized MAC address 116. The randomized MAC address 116 is used by the NIC 114 in network communications to protect the privacy of the electronic device 102.

The client agent 118 detects (at 204) a connection of the electronic device 102 to the network 106. For example, the connection can be a wired connection, and the detection is based on a physical connection of the electronic device 102 to a port of a communication device in the network 106. In another example, the network 106 is a wireless network, in which case the detected connection is a wireless connection. In some examples, the client agent 118 detects the connection of the electronic device 102 to the network 106 based on an indication of such connection from the OS 108.

In response to detecting the network connection, the client agent 118 obtains (at 206) the assigned MAC address 112 and the randomized MAC address 116 from the OS 108. For example, the client agent 118 can send a query to the OS 108 for a MAC address used by the electronic device 102. In response to such query, the OS 108 sends the randomized MAC address 116 and the assigned MAC address 112 to the client agent 118.

In some examples, the OS 108 is configured to retrieve the assigned MAC address 112 from the NIC 114 and provide the assigned MAC address 112 to a requesting entity such as the client agent 118. In other examples, an OS may be configured to prevent sharing of the assigned MAC address 112 with another entity (e.g., the client agent 118). Such other examples are discussed further below in connection with FIGS. 3A-3B.

The client agent 118 detects (at 208) that a MAC address received from the OS 108 is a randomized MAC address 116. This detection can be based on a determination by the client agent 118 that (1) two MAC addresses were received by the client agent 118 from the OS 108, and (2) the two MAC addresses are different from one another. The client agent 118 can determine which of the two MAC addresses received from the OS 108 is the randomized MAC address 116 based on a special address pattern in the randomized MAC address 116. A randomized MAC address starts with any of the following address patterns: x2, x6, xA, or xE, where x represents any 4-bit value (nibble), and 2, 6, A, and E are hexadecimal numbers. More specifically, the second nibble of a randomized MAC address is 2, 6, A, or E, in some examples.

The client agent 118 sends (at 210) to the management system 104 a DHCPINFORM message with a first information element (P1) that includes the randomized MAC address 116 and a second information element (P2) that includes the assigned MAC address 112 of the electronic device 102. The DHCPINFORM message is a request according to the DHCP protocol sent by electronic devices to servers to obtain configuration information to allow the electronic devices to communicate over a network. In some examples, the DHCPINFORM message has optional information elements that can be used for custom purposes. "Optional" information elements are information elements that may be optionally included in a message. An "information element" can refer to any value (e.g., a field, a parameter, etc.) of a message. In some examples of the present disclosure, the DHCP client 120 can populate two of the optional information elements (P1, P2) with the randomized MAC address 116 and the assigned MAC address 112, respectively. Note that in further examples the first information element (P1) can be the sender MAC address field of the header of the packet that includes the DHCPINFORM message.

In other examples, a different message can be used to transmit the randomized MAC address 116 and the assigned MAC address 112 to the management system 104. The different message can be according to the DHCP protocol, or alternatively, the different message can be according to another protocol, whether standardized, open source, or proprietary.

In some examples, to protect the assigned MAC address 112 from unauthorized access, at least the second information element, P2, of the DHCPINFORM message can be encrypted with an encryption key. In other examples, the entire DHCPINFORM message can be encrypted with an encryption key.

The DHCP server 131 in the management engine 130 can extract (at 212) the randomized MAC address 116 and the assigned MAC address 112 from the information elements P1 and P2, respectively, of the DHCPINFORM message. The DHCP server 131 provides the extracted randomized MAC address 116 and assigned MAC address 112 to the correlation information generator 132 in the management engine 130.

The correlation information generator 132 associates the randomized MAC address 116 with the assigned MAC address 112 received in the DHCPINFORM message. Based on this association, the correlation information generator 132 stores (at 214) the MAC address association in the form of address correlation information 134 (e.g., as an entry in a correlation information repository) in the memory 136 of the management system 104. The address correlation information 134 includes the randomized MAC address 116 and the assigned MAC address 112 that is associated with the randomized MAC address 116. In examples where there are multiple electronic devices managed by the management system 104, the management engine 130 can store multiple respective address correlation information instances for the respective electronic devices, to associate corresponding randomized MAC addresses of those electronic devices with corresponding assigned MAC addresses. The multiple address correlation information instances can be stored as respective entries in the correlation information repository (e.g., a database, a table, etc.), for example.

The memory 136 (or another memory) can also store a MAC registration database 138, which stores MAC addresses of electronic devices that have been registered by a system administrator or security manager, such as before a user starts to use the electronic device 102. An electronic device is "registered" with the management system 104 if the electronic device's presence is known to the management system 104 and the management system 104 has or is about to perform a management action with respect to the electronic device.

The MAC registration database 138 includes multiple entries for respective electronic devices. Each entry includes the MAC address of the respective electronic device, to indicate that the electronic device has been registered by the management system 104. In examples according to FIG. 2, the MAC address in each entry of the MAC registration database 138 is the assigned MAC address of the respective electronic device, which can be provided by a client agent such as 118 in FIG. 1. In other examples, such as according to FIGS. 3A-3B, the MAC address in each entry of the MAC registration database 138 is a pseudo MAC address different from the assigned MAC address (discussed further below in connection with FIGS. 3A-3B). As explained further below, the pseudo MAC address is derived from a device identifier provided by a client agent such as 118 in FIG. 1.

At this point (at task 212 in FIG. 2), no entry exists yet in the MAC registration database 138 for the electronic device 102; in other words, the electronic device 102 is not yet registered with the management system 104.

Figure 2:
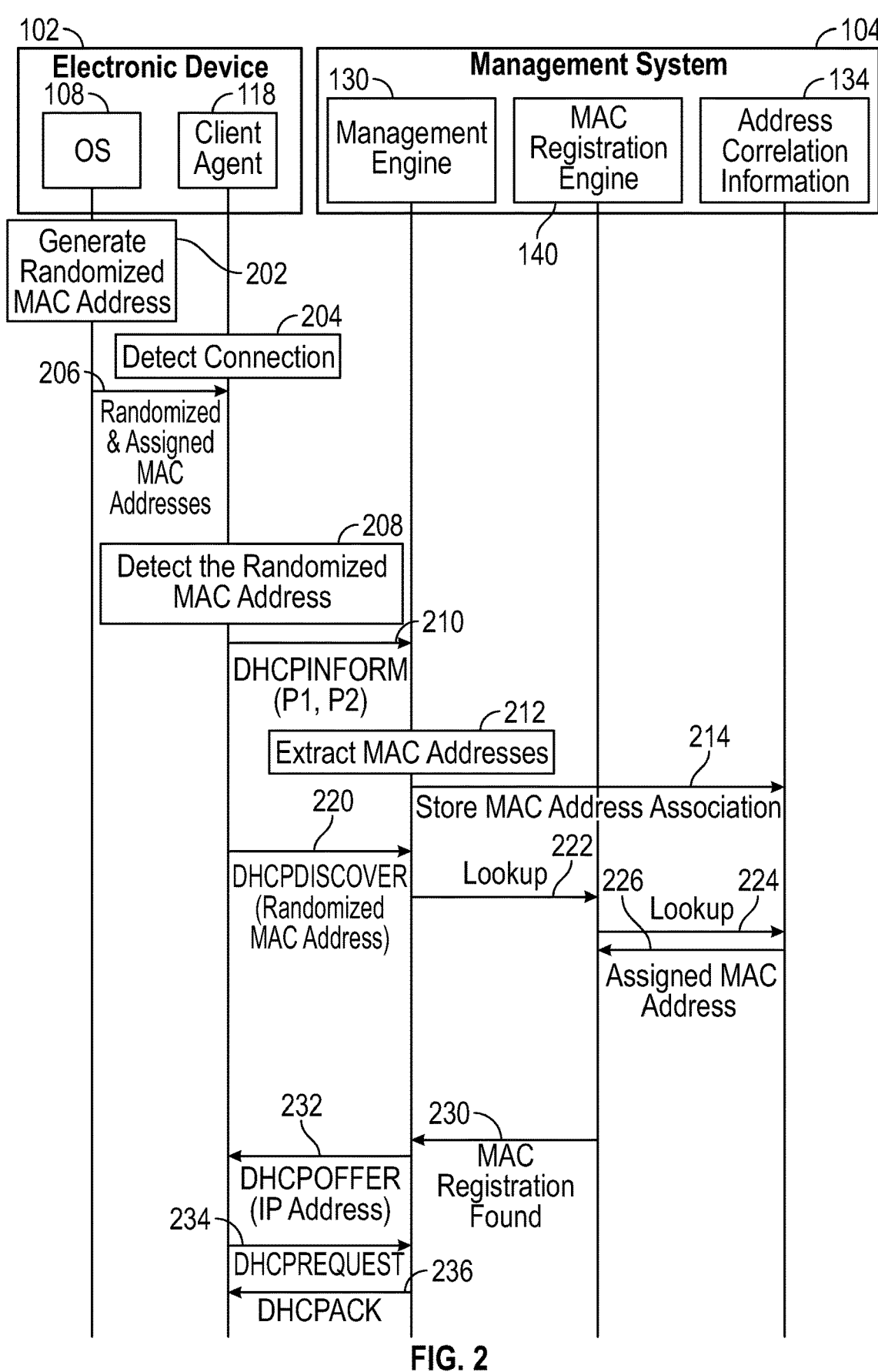
FIGS. 2 and 3A-3B are message flow diagrams of processes formed by electronic devices and management systems according to some examples.

In examples according to FIG. 2, the DHCP client 120 in the electronic device 102 initiates a DHCP process to cause the management system 104, and more specifically the DHCP server 131, to assign an IP address to the electronic device 102. In such examples, a management action performed by the management system 104 is an IP assignment action.

In other examples, the management system 104 can perform other management actions. In such other examples, the electronic device 102 can initiate other processes to cause the management system 104 to perform such other management actions, such as security actions, MDM actions, and so forth.

To initiate the DHCP process, the DHCP client 120 sends (at 220) a DHCPDISCOVER message to the management system 104. The DHCPDISCOVER message includes the randomized MAC address 116 (not the assigned MAC address 112) of the electronic device 102. In response to the DHCPDISCOVER message, the DHCP server 131 in the management system 104 performs a lookup (at 222) in the MAC registration database 138 to determine whether or not the received randomized MAC address 116 is in the MAC registration database 138. The lookup includes the DHCP server 131 sending a lookup request containing the randomized MAC address 116 to the MAC registration engine 140, which attempts to find an entry in the MAC registration database 138 containing the randomized MAC address 116. Since the randomized MAC address 116 included in the DHCPDISCOVER message is not in the MAC registration database 138, a lookup miss occurs.

In response to the lookup miss, the MAC registration engine 140 performs a lookup (at 224) to determine an existence of the address correlation information 134 that contains the randomized MAC address 116. If the address correlation information 134 that contains the randomized MAC address 116 exists, the MAC registration engine 140 retrieves (at 226) the assigned MAC address 112 associated with the randomized MAC address 116 by the address correlation information 134. The presence of the address correlation information 134 that contains the randomized MAC address 116 allows the management system 104 to authenticate the electronic device 102.

The MAC registration engine 140 can return (at 230) a MAC registration found indication to the DHCP server 131. The MAC registration found indication is an indication that an entry for the electronic device 102 was found in the MAC registration database 138. In parallel, a network access control process or an MDM process can also be performed to decide whether the electronic device 102 is in a valid state; if the network access control process or MDM process determines that the electronic device 102 is not in the valid state, the network access control process or MDM process can inform the MAC registration engine 140 to cause a MAC registration miss indication, so that the management engine 130 would not provide an IP address to the electronic device 102.

In response to the MAC registration found indication, the DHCP server 131 sends (at 232) a DHCPOFFER message to the electronic device 102. Note that the DHCPOFFER message is responsive to the DHCPDISCOVER message from the DHCP client 120. The DHCPOFFER message includes a lease offer for an IP address. The lease offer can include the IP address that the DHCP server 131 is offering, and a duration of the lease, among other information.

In response to the DHCPOFFER message, the DHCP client 120 sends (at 234) a DHCPREQUEST message to the DHCP server 131. The DHCPREQUEST message indicates an acceptance of the DHCPOFFER. In some examples, it is possible that the electronic device 102 received multiple DHCPOFFERs from multiple DHCP servers. The DHCP client 120 can accept one of the DHCPOFFERs. The DHCPREQUEST message includes an identification of the DHCP server 131 whose DHCPOFFER the DHCP client 120 has accepted.

In response to the DHCPREQUEST message, the DHCP server 131 sends (at 236) a DHCPACK message to the DHCP client 120. The DHCPACK message includes the lease duration and any other configuration information that the DHCP client 120 may have requested. At this point, the DHCP process is completed, and the electronic device 102 has been assigned an IP address that the electronic device 102 can use in IP communications over the network 106.

In other examples where the management system 104 performs other management actions, instead of exchanging DHCP messages (220, 232, 234, and 236) between the electronic device 102 and the management system 104, other messages can be used. In such other examples, the client agent 118 can send a first message (containing the randomized MAC address 116) to the management engine 130 (in place of the DHCPDISCOVER message sent at 220). The management system 104 can then perform tasks similar to 222, 224, 226, 228, and 230 to find the assigned MAC address 112 for the electronic device 102. Subsequently, the management system 104 can perform other tasks including exchanging further message(s) with the electronic device 102 to complete a management action for the electronic device 102.

Post Association Technique

Examples of the post association technique are described in connection with FIGS. 1 and 3A-3B. Although FIGS. 3A-3B show a specific order of tasks, it is noted that the order of tasks can be changed in other examples, some of the tasks may be omitted, or additional tasks may be added.

The OS 108 in the electronic device 102 generates (at 302) the randomized MAC address 116. The client agent 118 detects (at 304) a connection of the electronic device 102 to the network 106.

Figure 3A:
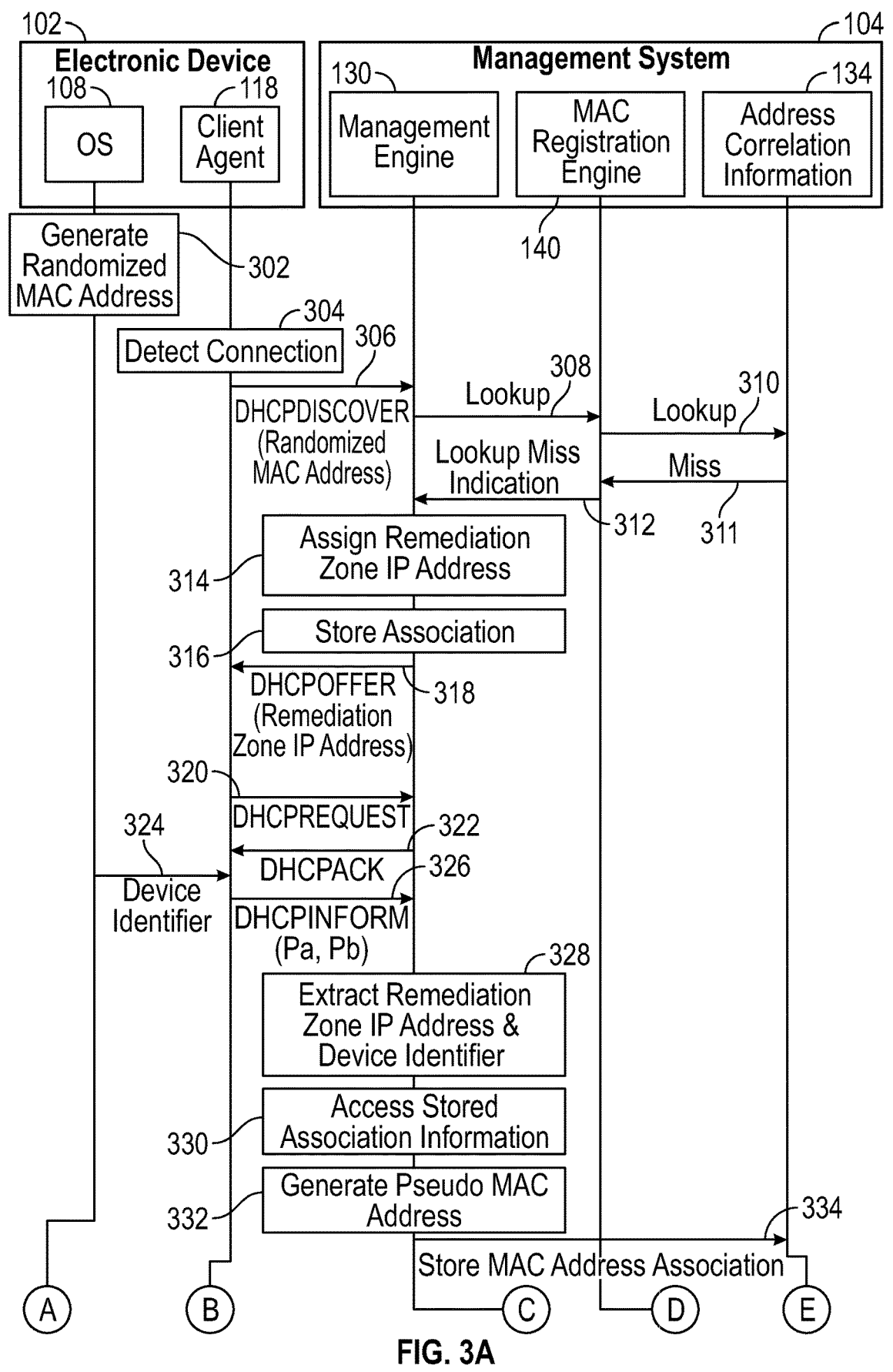
Figure 3B:
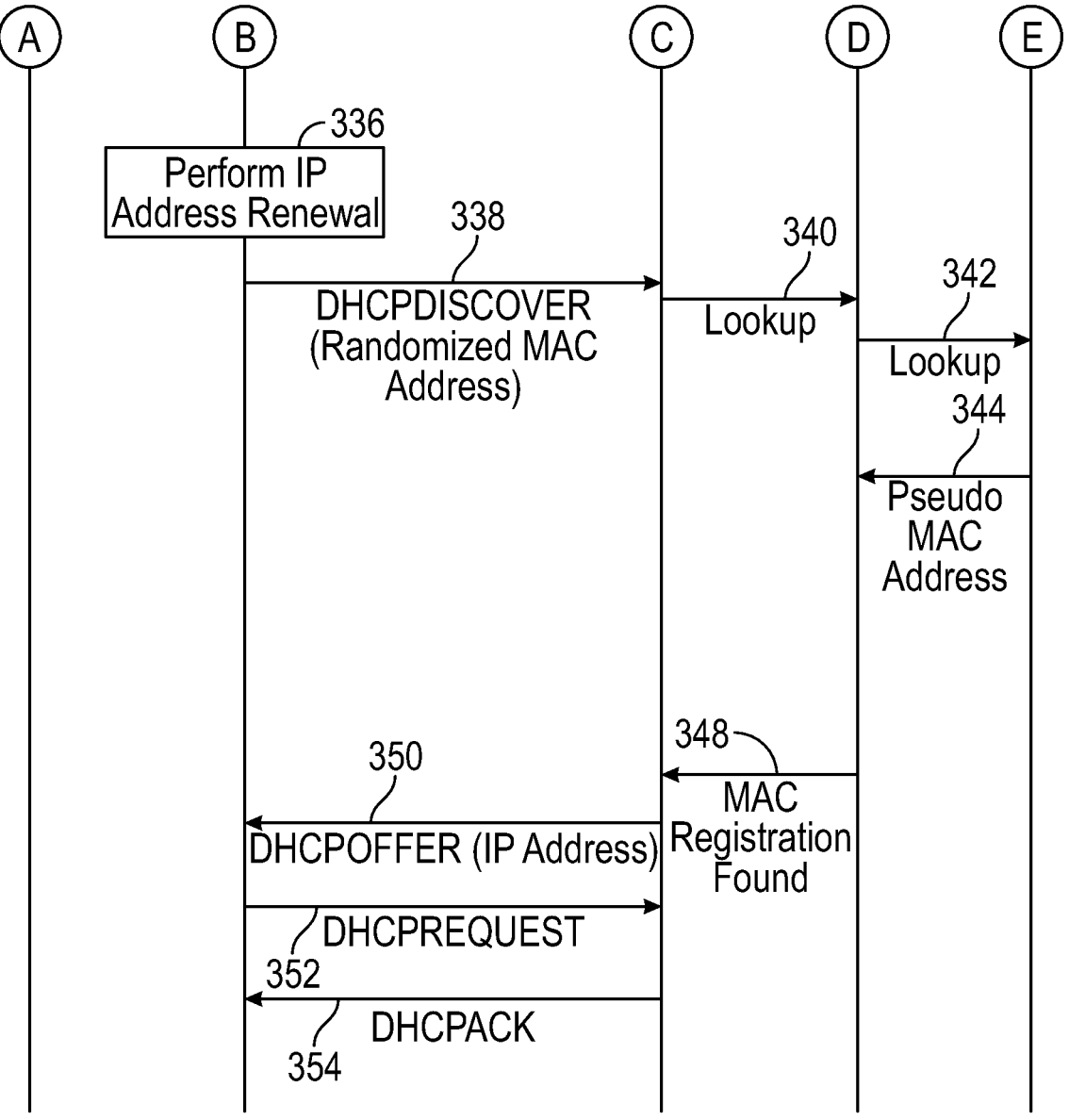

In examples according to FIGS. 3A-3B, the OS 108 does not allow a program such as such as the client agent 118 to obtain the assigned MAC address 112. In such examples, the client agent 118 is able to obtain the randomized MAC address 116 from the OS 108, but not the assigned MAC address 112.

The client DHCP client 120 initiates a DHCP process by sending (at 306) a DHCPDISCOVER message containing the randomized MAC address 116 to the management system 104. In response to the DHCPDISCOVER message, the DHCP server 131 in the management system 104 performs a lookup (at 308) in the MAC registration database 138 to determine whether or not the received randomized MAC address 116 is in the MAC registration database 138. The lookup includes the DHCP server 131 sending a lookup request containing the randomized MAC address 116 to the MAC registration engine 140, which attempts to find an entry in the MAC registration database 138 containing the randomized MAC address 116. Since the randomized MAC address 116 included in the DHCPDISCOVER message is not in the MAC registration database 138, a lookup miss occurs.

In response to the lookup miss, the MAC registration engine 140 performs a lookup (at 310) to determine an existence of address correlation information that contains the randomized MAC address 116. At this point, no address correlation information exists that contains the randomized MAC address 116. As a result, a lookup miss occurs (at 311), and the MAC registration engine 140 sends (at 312) a lookup miss indication to the DHCP server 131.

In response to the lookup miss indication, the DHCP server 131 can assign (at 314) a remediation zone IP address to the electronic device 102 for use by the electronic device 102 in a remediation zone network (a quarantine network) that can be used in scenarios where an issue exists with the electronic device 102 and the management engine 130 seeks to remediate the issue. The remediation zone network does not allow the electronic device 102 access of the resources available on the network 106, which is the operational network corresponding to the remediation zone network. Note that the remediation zone network is not a physical network that is separate from the network 106, but rather, is a logical network implemented at the management system 104 (and that corresponds to the network 106) to restrict access to electronic devices with issues. When an electronic device communicates using a remediation zone IP address, that indicates to the management system 104 that restricted access is to be imposed on the electronic device.

The DHCP server 131 stores (at 316) (such as in the memory 136 of the management system 104) association information that correlates the remediation zone IP address with the randomized MAC address 116.

Responsive to the DHCPDISCOVER message (at 306), the DHCP server 131 sends (at 318) a DHCPOFFER message that contains the remediation zone IP address. In response to the DHCPOFFER message, the DHCP client 120 sends (at 320) a DHCPREQUEST message to the DHCP server 131. The DHCP server 131 acknowledges (at 322) the DHCPREQUEST message with a DHCPACK message. The messages 308, 318, 320, and 322 are part of a DHCP process in which a remediation zone IP address is assigned by the DHCP server 131 to the electronic device 102. In other examples, the management engine 130 does not provide a remediation zone IP address (i.e., a remediation zone technique is not used), in which case no IP address is assigned in response to the DHCPDISCOVER message sent at 306.

The client agent 118 obtains (at 324) a device identifier from the OS 108. The device identifier can be a program-generated identifier, which can be generated by the OS 108, for example. In a specific example, the device identifier can be an Identifier for Vendor (IDFV) that can be provided by some OSs, such as an ANDROID OS or an iOS. The device identifier is provided by the OS 108 instead of the assigned MAC address 112.

The client agent 118 sends (at 326) to the management system 104 a DHCPINFORM message with a first information element (Pa) that includes the randomized MAC address 116 and a second information element (Pb) that includes the device identifier (e.g., IDFV) of the electronic device 102. The information elements Pa and Pb may be the same as or different from the information elements P1 and P2 of FIG. 2. Note that in some examples the first information element (Pa) can be the sender MAC address field of the header of the packet that includes the DHCPINFORM message.

The DHCP server 131 in the management engine 130 can extract (at 328) the remediation zone IP address and the device identifier from the information elements Pa and Pb, respectively, of the DHCPINFORM message (326). The management engine 130 accesses (at 330) the stored association information (stored at 316) that correlates the remediation zone IP address and the randomized MAC address 116. This allows the management engine 130 to determine the randomized MAC address 116 that corresponds to the remediation zone IP address obtained from the DHCPINFORM message (326).

The management engine 130 generates (at 332) a pseudo MAC address from the device identifier obtained from the information element Pb of the DHCPINFORM message. In some examples, the pseudo MAC address can be computed by applying a function (e.g., a hash function or another function) on the device identifier, to obtain an output value that is the same length as a MAC address. In other examples, the pseudo MAC address can be obtained from a correlation table that correlates different device identifiers to different values (that represent the pseudo MAC addresses). Note that the pseudo MAC address is not a real MAC address (such as the assigned MAC address 112) but rather is a representation of a MAC address that can be used at the management system 104 to perform a management action for the electronic device 102 in scenarios where randomized MAC addresses are used by the electronic device 102.

The correlation information generator 132 associates the randomized MAC address 116 with the pseudo MAC address, and stores (at 334) the MAC address association in the form of address correlation information 134 in the memory 136 of the management system 104. The address correlation information 134 in examples according to FIGS. 3A-3B associates the randomized MAC address 116 with the pseudo MAC address (instead of the assigned MAC address 112 as is the case in FIG. 2).

At this point (at task 334 in FIG. 3A), no entry exists yet in the MAC registration database 138 for the electronic device 102; in other words, the electronic device 102 is not yet registered with the management system 104.

As shown FIG. 3B, the DHCP client 120 in the electronic device 102 can decide to perform an IP address renewal (at 336). An assigned IP address can have a lease duration, after which an electronic device would have to perform an IP address renewal process to obtain an IP address for another lease duration. The IP address renewal (at 336) can be triggered by any of various events, such as the expiration of a timer or another event.

In response to the decision to perform the IP address renewal, the DHCP client 120 initiates a DHCP process with the management system 104. The DHCP client 120 sends (at 338) a DHCPDISCOVER message to the management system 104. The DHCPDISCOVER message includes the randomized MAC address 116 (not the assigned MAC address 112) of the electronic device 102.

In response to the DHCPDISCOVER message, the DHCP server 131 in the management system 104 performs a lookup (at 340) in the MAC registration database 138 to determine whether or not the received randomized MAC address 116 is in the MAC registration database 138. The lookup includes the DHCP server 131 sending a lookup request containing the randomized MAC address 116 to the MAC registration engine 140, which attempts to find an entry in the MAC registration database 138 containing the randomized MAC address 116. Since the randomized MAC address 116 included in the DHCPDISCOVER message is not in the MAC registration database 138, a lookup miss occurs.

In response to the lookup miss, the MAC registration engine 140 performs a lookup (at 342) to determine an existence of the address correlation information 134 that contains the randomized MAC address 116. If the address correlation information 134 that contains the randomized MAC address 116 exists, the MAC registration engine 140 retrieves (at 344) the pseudo MAC address associated with the randomized MAC address 116 by the address correlation information 134.

The MAC registration engine 140 can return (at 348) a MAC registration found indication to the DHCP server 131. The MAC registration found indication is an indication that an entry for the electronic device 102 was found in the MAC registration database 138. In parallel, a network access control process or an MDM process can also be performed to decide whether the electronic device 102 is in a valid state; if the network access control process or MDM process determines that the electronic device 102 is not in the valid state, the network access control process or MDM process can inform the MAC registration engine 140 to cause a MAC registration miss indication, so that the management engine 130 would not provide an IP address to the electronic device 102.

In response to the MAC registration found indication, the DHCP server 131 sends (at 350) a DHCPOFFER message to the electronic device 102. The DHCPOFFER message includes a lease offer for an operational IP address that can be used on the network 106 (the operational IP address is different from the remediation zone IP address).

In response to the DHCPOFFER message, the DHCP client 120 sends (at 352) a DHCPREQUEST message to the DHCP server 131. The DHCPREQUEST message indicates an acceptance of the DHCPOFFER. In response to the DHCPREQUEST message, the DHCP server 131 sends (at 354) a DHCPACK message to the DHCP client 120. At this point, the DHCP process is completed, and the electronic device 102 has been assigned an operational IP address that the electronic device 102 can use in IP communications over the network 106.

FURTHER EXAMPLES

Figure 4:
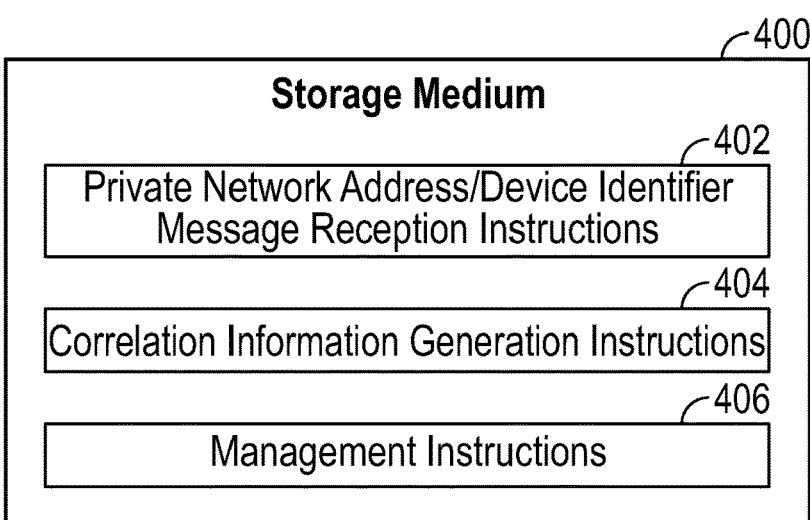
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a management system (e.g., 104 in FIG. 1) to perform various tasks.

The machine-readable instructions include private network address/device identifier message reception instructions 402 to receive, at the management system from an electronic device, a message (e.g., a DHCPINFORM message) containing a first information element that includes a private network address of the electronic device, and a second information element that includes a device identifier of the electronic device. The private network address (e.g., the randomized MAC address 116 of FIG. 1) differs from an assigned network address (e.g., the assigned MAC address 112 of FIG. 1) assigned to the electronic device. In some examples, the device identifier includes the assigned MAC address (e.g., according to FIG. 2). In other examples, the device identifier includes a program-generated device identifier (e.g., IDFV according to FIGS. 3A-3B).

The machine-readable instructions include correlation information generation instructions 404 to, in response to the private network address extracted from the first information element and the device identifier extracted from the second information element of the message, generate correlation information that associates the private network address (e.g., the randomized MAC address 116) of the electronic device with a value that represents the assigned network address. The value that represents the assigned network address can be the assigned network address (e.g., the assigned MAC address 112) or a pseudo random access (e.g., the pseudo MAC address derived from the IDFV).

The machine-readable instructions include management instructions 406 to apply a management action for the electronic device based on the correlation information. The management action can include any or some combination of the following: an assignment of an IP address, such as according to a DHCP process (or more specifically, an authenticated DHCP process), a network access control process or an MDM process that confirms that the electronic device has a configuration in compliance with a policy, a network access control process that disconnects an electronic device from a network in response to determining that a private network address of the electronic device is not correlated by correlation information to a value representing an assigned network address of the further electronic device, and so forth.

In some examples, the machine-readable instructions receive, at the management system from the electronic device, a further message (e.g., a DHCPDISCOVER message such as at 220 or 338) that requests information to allow the electronic device to communicate over a network. The further message contains the private network address. The machine-readable instructions authenticate the electronic device in response to determining that the correlation information associates the private network address with the value that represents the first network address.

Figure 5:
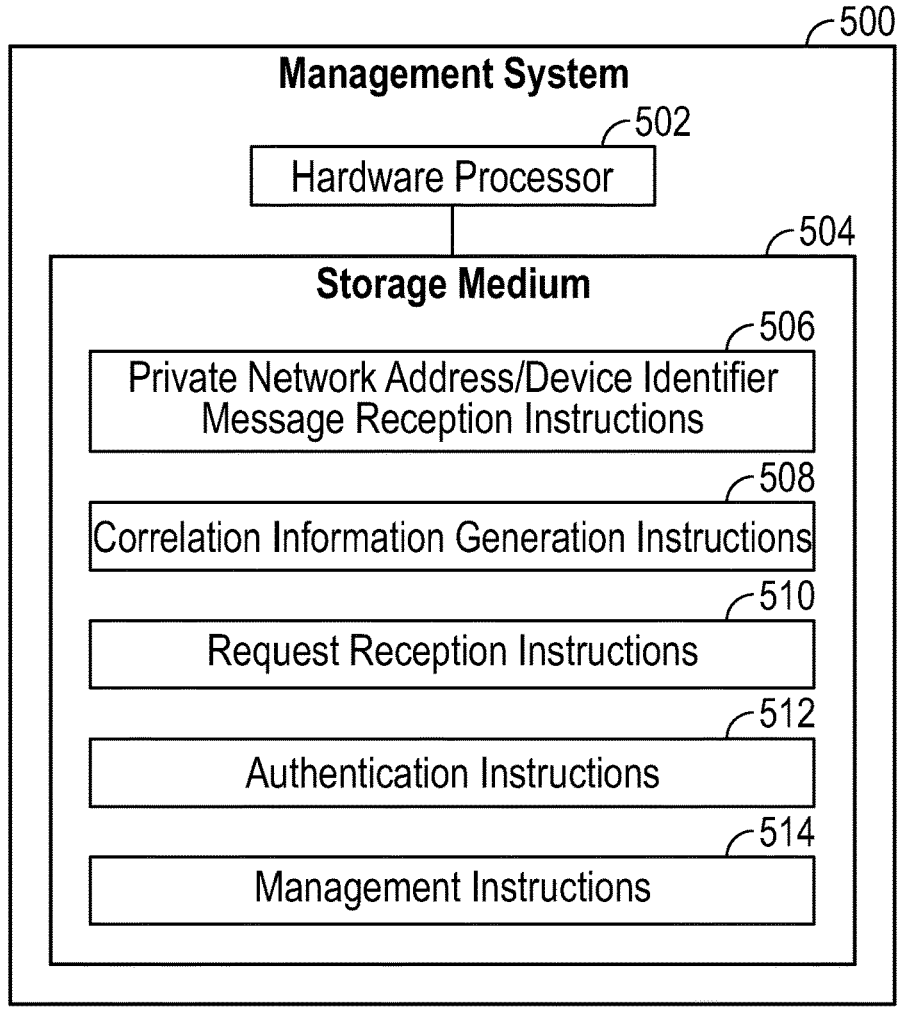
FIG. 5 is a block diagram of a system according to some examples.

FIG. 5 is a block diagram of a management system 500 that includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The management system 500 includes a storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include private network address/device identifier message reception instructions 506 to receive, at the management system from an electronic device, a message containing a first information element that includes a private network address of the electronic device, and a second information element that includes a device identifier of the electronic device. The private network address differs from an assigned network address assigned to the electronic device.

The machine-readable instructions in the storage medium 504 include correlation information generation instructions 508 to, in response to the private network address extracted from the first information element and the device identifier extracted from the second information element of the message, generate correlation information that associates the private network address of the electronic device with a value that represents the assigned network address. The value can be the assigned network address or a pseudo network address.

The machine-readable instructions in the storage medium 504 include request reception instructions 510 to receive, at the management system from the electronic device, a request for a management action. The request contains the private network address of the electronic device. The management action requested can be any of the management actions discussed above.

The machine-readable instructions in the storage medium 504 include authentication instructions 512 to, in response to the request, determine whether the private network address is in the correlation information. The presence of the private network address in the correlation information allows the management system 500 to authenticate the electronic device.

The machine-readable instructions in the storage medium 504 include management instructions 514 to, in response to the private network address being in the correlation information, apply the management action for the electronic device.

FIG. 6 is a flow diagram of a process 600 according to some examples. The process 600 can be performed by a management system, for example.

The process 600 includes receiving (at 602), at the management system from an electronic device, a message containing a first information element that includes a private MAC address of the electronic device, and a second information element that includes a device identifier of the electronic device. The private MAC address differs from an assigned MAC address assigned to the electronic device. The device identifier can be the assigned MAC address or a program-generated device identifier.

The process 600 includes, in response to the private MAC address extracted from the first information element and the device identifier extracted from the second information element of the message, generating (at 604), at the management system, correlation information that associates the private MAC address of the electronic device with a value that represents the assigned MAC address. The value that represents the assigned MAC address can be the assigned MAC address or a pseudo MAC address derived from the program-generated device identifier.

The process 600 includes receiving (at 606), at the management system from the electronic device, a request for a management action, the request containing the private MAC address of the electronic device. The request can be a request to initiate a DHCP process, such as a DHCPDISCOVER message. In other examples, the request can be another request.

The process 600 includes, in response to the request, determining (at 608), by the management system, whether the private MAC address is in the correlation information. In response to the private MAC address being in the correlation information, the process 600 includes applying (at 610), by the management system, the management action for the electronic device.

A storage medium (e.g., 400 in FIG. 4 or 504 in FIG. 5) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a management system to:

receive, at the management system from an electronic device, a message containing a first information element that includes a private network address of the electronic device, and a second information element that includes a device identifier of the electronic device, wherein the private network address differs from an assigned network address assigned to the electronic device;

in response to the private network address extracted from the first information element and the device identifier extracted from the second information element of the message, generate correlation information that associates the private network address of the electronic device with a value that represents the assigned network address; and apply a management action for the electronic device based on the correlation information, wherein the device identifier in the message is the assigned network address, and the value, in the correlation information, that represents the assigned network address is the assigned network address.

2. The non-transitory machine-readable storage medium of claim 1, wherein the private network address is a randomized Media Access Control (MAC) address.

3. The non-transitory machine-readable storage medium of claim 1, wherein the first information element is part of a header of a packet comprising the message.

4. The non-transitory machine-readable storage medium of claim 1, wherein the applying of the management action based on the correlation information comprises using the correlation information to verify that the electronic device is registered with the management system.

5. The non-transitory machine-readable storage medium of claim 1, wherein the message is a Dynamic Host Configuration Protocol (DHCP) message.

6. The non-transitory machine-readable storage medium of claim 1, wherein the instructions upon execution cause the management system to:

receive, at the management system from the electronic device, a further message that requests information to allow the electronic device to communicate over a network, wherein the further message contains the private network address; and authenticate the electronic device in response to determining that the correlation information associates the private network address with the value that represents the assigned network address, wherein the management action comprises the authenticating of the electronic device.

7. The non-transitory machine-readable storage medium of claim 6, wherein the further message is to request an Internet Protocol (IP) address, and wherein the private network address is a randomized Media Access Control (MAC) address.

8. The non-transitory machine-readable storage medium of claim 1, wherein the device identifier in the message is a program-generated identifier of the electronic device generated by a program in the electronic device, and the value, in the correlation information, that represents the assigned network address is derived based on the program-generated identifier.

9. The non-transitory machine-readable storage medium of claim 8, wherein the value that represents the assigned network address is a pseudo network address.

10. The non-transitory machine-readable storage medium of claim 1, wherein a portion of the message containing the second information element is encrypted with an encryption key.

11. The non-transitory machine-readable storage medium of claim 1, wherein the message is a first message, and wherein the instructions upon execution cause the management system to:

receive a second message containing the private network address of the electronic device;

in response to the second message, determine whether the correlation information is present in the management system; and in response to determining that the correlation information is not present in the management system, send a response to the second message, the response containing a remediation zone Internet Protocol (IP) address assigned to the electronic device.

12. The non-transitory machine-readable storage medium of claim 1, wherein the management action comprises an authenticated Dynamic Host Configuration Protocol (DHCP) process.

13. The non-transitory machine-readable storage medium of claim 1, wherein the management action comprises confirming, as part of a network access control process, that the electronic device has a configuration in compliance with a policy.

14. The non-transitory machine-readable storage medium of claim 1, wherein the management action comprises disconnecting a further electronic device from a network in response to determining that a private network address of the further electronic device is not correlated by correlation information to a value representing an assigned network address of the further electronic device.

15. A management system comprising:

a hardware processor; and a non-transitory storage medium storing instructions executable on the hardware processor to:

receive, at the management system from an electronic device, a message containing a first information element that includes a private network address of the electronic device, and a second information element that includes a device identifier of the electronic device, wherein the private network address differs from an assigned network address assigned to the electronic device;

in response to the private network address extracted from the first information element and the device identifier extracted from the second information element of the message, generate correlation information that associates the private network address of the electronic device with a value that represents the assigned network address;

receive, at the management system from the electronic device, a request for a management action, the request containing the private network address of the electronic device;

in response to the request, determine whether the private network address is in the correlation information; and in response to the private network address being in the correlation information, apply the management action for the electronic device, wherein the device identifier in the message is a program-generated device identifier, and wherein the instructions are executable on the hardware processor to:

generate a pseudo network address based on the program-generated device identifier, wherein the correlation information associates the private network address with the pseudo network address.

16. The management system of claim 15, wherein the device identifier in the message is the assigned network address, and the correlation information associates the private network address with the assigned network address.

17. A method of a management system, comprising:

receiving, at the management system from an electronic device, a message containing a first information element that includes a private Media Access Control (MAC) address of the electronic device, and a second information element that includes a device identifier of the electronic device, wherein the private MAC address differs from an assigned MAC address assigned to the electronic device;

in response to the private MAC address extracted from the first information element and the device identifier extracted from the second information element of the message, generating, at the management system, correlation information that associates the private MAC address of the electronic device with a value that represents the assigned MAC address;

receiving, at the management system from the electronic device, a request for a management action, the request containing the private MAC address of the electronic device;

in response to the request, determining, by the management system, whether the private MAC address is in the correlation information; and in response to the private MAC address being in the correlation information, applying, by the management system, the management action for the electronic device, wherein the device identifier in the message is the assigned network address, and the value, in the correlation information, that represents the assigned network address is the assigned network address.

18. The method of claim 17, wherein the device identifier in the message is the assigned MAC address or a program-generated device identifier.

\* \* \* \* \*